(12) United States Patent
Hudis et al.

(10) Patent No.: US 8,990,947 B2
(45) Date of Patent: Mar. 24, 2015

(54) ANALYTICS ENGINE

(75) Inventors: Efim Hudis, Bellevue, WA (US); Eyal Zangi, Zichron Yaacov (IL); Moshe Sapir, Rishon Letzion (IL); Tomer Weisberg, Haifa (IL); Yair Helman, Kefar Neter (IL); Shai Aharon Rubin, Binyamina (IL); Yosef Dinerstein, Haifa (IL); Lior Arzi, Atlit (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 1322 days.

(21) Appl. No.: 12/141,897

(22) Filed: Jun. 18, 2008

(65) Prior Publication Data

US 2009/0199265 A1 Aug. 6, 2009

Related U.S. Application Data

(60) Provisional application No. 61/026,118, filed on Feb. 4, 2008.

(51) Int. Cl.
*G06F 21/57* (2013.01)
*G06F 21/62* (2013.01)
*G06N 5/02* (2006.01)
*H04L 29/06* (2006.01)

(52) U.S. Cl.
CPC .......... *G06F 21/577* (2013.01); *G06F 21/6209* (2013.01); *G06F 2221/2145* (2013.01); *G06F 2221/2151* (2013.01); *G06N 5/025* (2013.01); *H04L 63/1433* (2013.01)
USPC .......................................................... 726/25

(58) Field of Classification Search
None
See application file for complete search history.

(56) References Cited

U.S. PATENT DOCUMENTS

| | | | |
|---|---|---|---|
| 6,535,227 | B1 | 3/2003 | Fox et al. |
| 6,704,874 | B1 | 3/2004 | Porras et al. |
| 6,952,779 | B1 | 10/2005 | Cohen et al. |
| 7,085,762 | B2 | 8/2006 | Medicke et al. |
| 7,251,822 | B2 * | 7/2007 | Agarwal et al. ................... 726/1 |
| 7,437,760 | B2 * | 10/2008 | Dettinger et al. ............... 726/24 |
| 2004/0049698 | A1 * | 3/2004 | Ott et al. ....................... 713/201 |
| 2005/0257267 | A1 | 11/2005 | Williams et al. |
| 2007/0016542 | A1 | 1/2007 | Rosauer et al. |
| 2007/0143851 | A1 | 6/2007 | Nicodemus et al. |
| 2007/0244650 | A1 | 10/2007 | Gauthier |
| 2007/0291118 | A1 | 12/2007 | Shu et al. |

OTHER PUBLICATIONS

"Open Source Security Information Management", Version 0.18, Nov. 26, 2003, pp. 30.
"SenSage Positioned in Visionaries Quadrant within Security Information Event Management Market", May 22, 2006, SenSage, Inc., pp. 2.
"Open Technology Architecture: Leverages your Existing Investment", Metrikus, Inc., pp. 2.

* cited by examiner

*Primary Examiner* — Gilberto Barron, Jr.
*Assistant Examiner* — Simon Kanaan
(74) *Attorney, Agent, or Firm* — Henry Gabryjelski; Timothy Churna; Micky Minhas (57) ABSTRACT

Aspects of the subject matter described herein relate to a mechanism for assessing security. In aspects, an analytics engine is provided that manages execution, information storage, and data passing between various components of a security system. When data is available for analysis, the analytics engine determines which security components to execute and the order in which to execute the security components, where in some instances two or more components may be executed in parallel. The analytics engine then executes the components in the order determined and passes output from component to component as dictated by dependencies between the components. This is repeated until a security assessment is generated or updated. The analytics engine simplifies the work of creating and integrating various security components.

18 Claims, 5 Drawing Sheets

ANALYTICS ENGINE

CROSS REFERENCE TO RELATED APPLICATION

This application claims the benefit of U.S. Provisional Application No. 61/026,118, filed Feb. 4, 2008, entitled ANALYTICS ENGINE, which application is incorporated herein in its entirety.

BACKGROUND

Keeping technology assets secure is a challenge. For example, with networked assets, attackers continue to create new security threats aimed at one or more of the resources of the network. Some of these security threats may attempt to exploit a known weakness of a node within the network. Once they have compromised the node, the security threat may attempt to compromise other nodes through various techniques. Because a security threat may involve various assets and/or components contained thereon, determining the state of security for assets is challenging.

SUMMARY

Briefly, aspects of the subject matter described herein relate to a mechanism for assessing security. In aspects, an analytics engine is provided that manages execution, information storage, and data passing between various components of a security system. When data is available for analysis, the analytics engine determines which security components to execute and the order in which to execute the security components, where in some instances two or more components may be executed in parallel. The analytics engine then executes the components in the order determined and passes output from component to component as dictated by dependencies between the components. This is repeated until a security assessment is generated or updated. The analytics engine simplifies the work of creating and integrating various security components.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
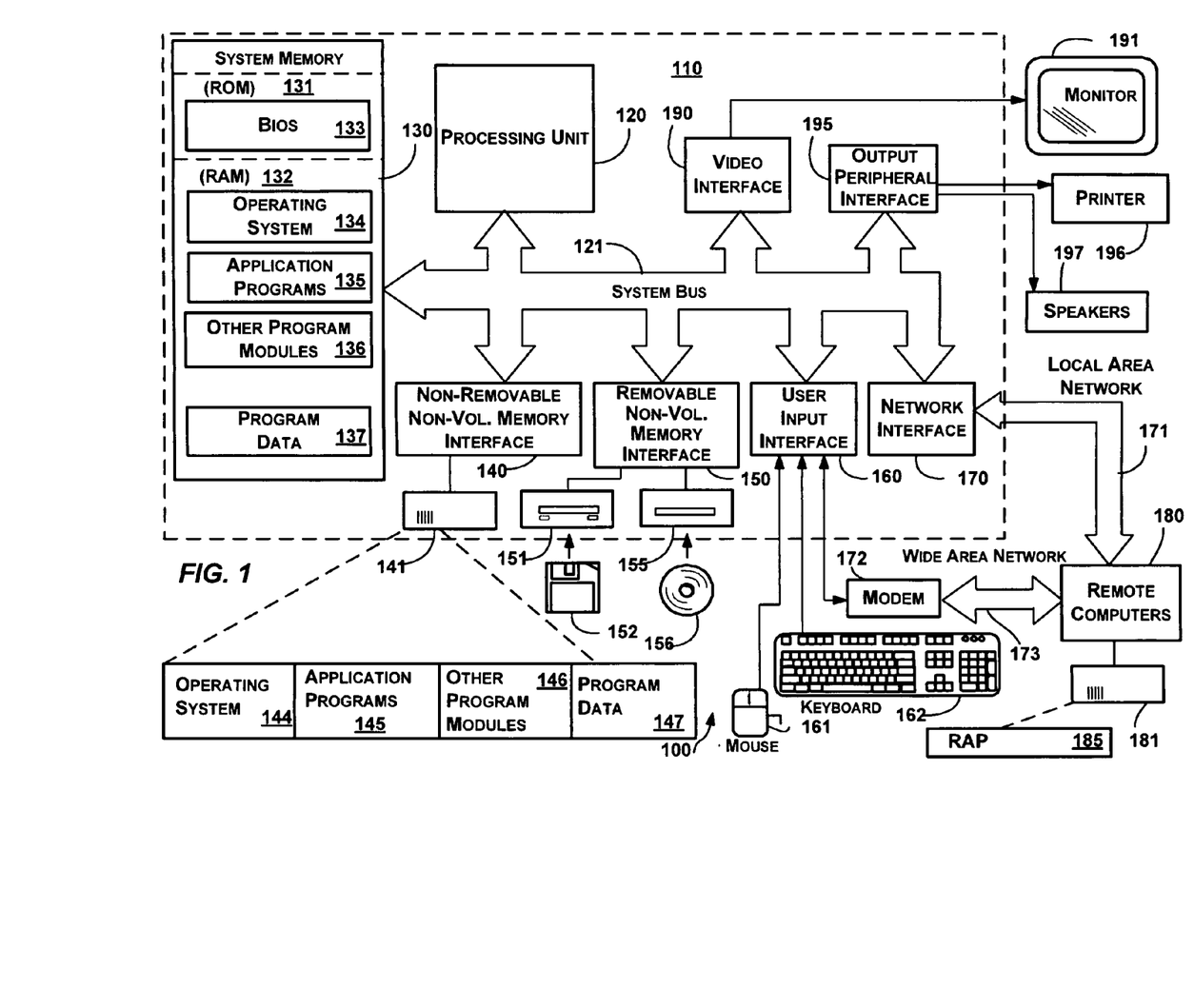
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Analytics Engine

As mentioned previously, keeping technology assets (hereinafter "computer-related assets" or simply "assets") secure is a significant challenge. To address this challenge, it is useful to determine the security of the assets, which is also a challenge because of the nature of security threats. Some examples of an asset include a computer, network device, or other electronic device, data in a database, a site, network, user account, document, a portion or all of an enterprise, a set of one or more entities a plurality of one or more of the above, and the like. The above examples, however, are not intended to be all-inclusive or exhaustive. Furthermore, an asset may be accessible via a network or not accessible via a network.

For example, an asset may be accessible via the Internet, may be accessible only from a private network, or may not be connected to a network.

As used herein, an assessment is a security determination that is made regarding the security of an asset. For example, an assessment may indicate that an asset has been compromised and that the severity is critical. The evaluation may also include a level of confidence (sometimes referred to as fidelity) of the assessment and a time in which the assessment is valid. For example, the assessment may indicate that the fidelity of the assessment is high, medium, low, or some other level of fidelity and that the assessment will expire in 30 minutes.

Figure 2:
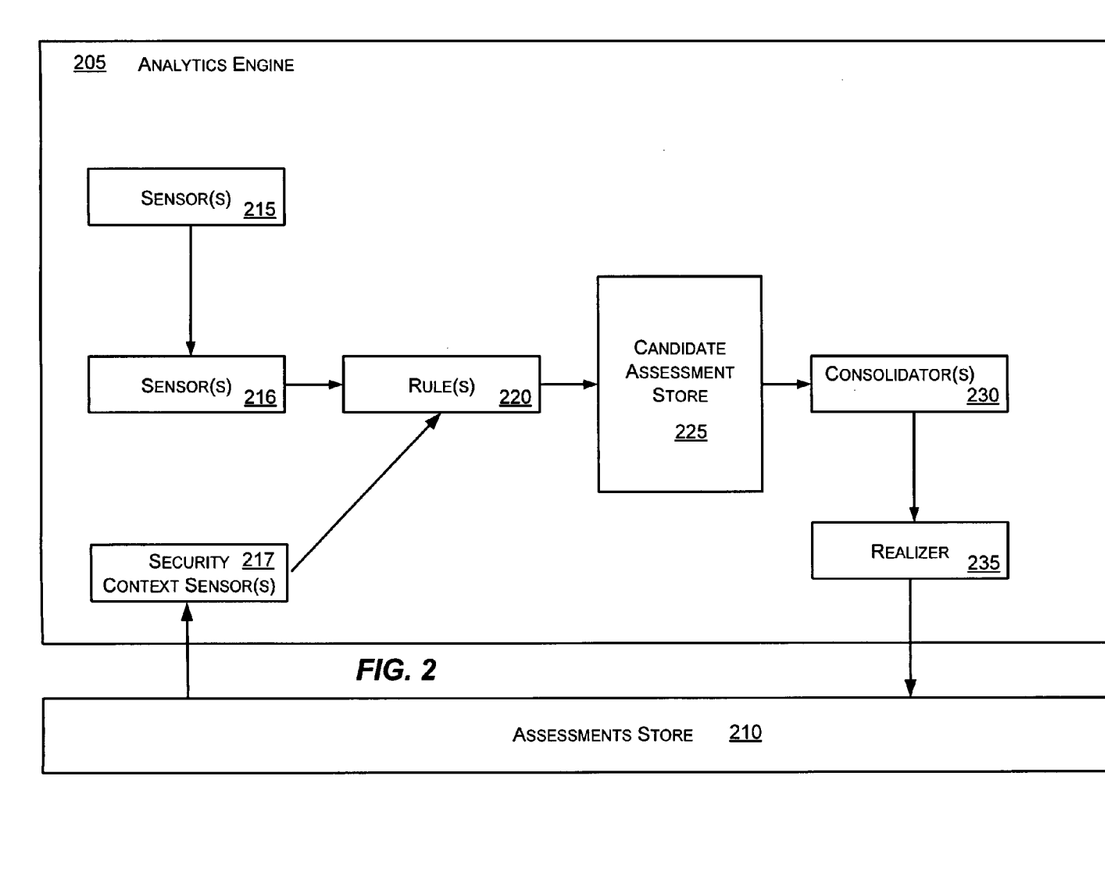
FIG. 2 is a block diagram illustrating various components that may be included in an environment arranged in accordance with aspects of the subject matter described herein.

FIG. 2 is a block diagram illustrating various components that may be included in an environment arranged in accordance with aspects of the subject matter described herein. The components illustrated in FIG. 2 are exemplary and are not meant to be all-inclusive of components that may be needed or included. In other embodiments, the components and/or functions described in conjunction with FIG. 2 may be included in other components or placed in subcomponents without departing from the spirit or scope of aspects of the subject matter described herein.

Turning to FIG. 2, an analytics engine 205 and an assessments store 210 are shown. The analytics engine 205 includes a candidate assessment store 225 and a realizer 235 and may include or be associated with one or more sensors 215-217, rules 220, and consolidators 230. The components of FIG. 2 may be executed on one or more computers (e.g., the computer 110 of FIG. 1) and may be distributed or centralized.

A sensor receives input data or other triggering information and provides data as output. In some embodiments, the data a sensor receives may come from one or more other sensors, data generated by other security components, data generated by other non-security components, and the like. In one embodiment, a sensor may receive information from a timer such that the sensor provides an indication when the timer fires. Other security components may reside on or be comprised of devices or components including, for example, a router, firewall, network intrusion detection device, network access protection device, anti-malware client, other security components, and the like. As used herein, the term component is to be read to include all or a portion of a device, one or more software components executing on one or more devices, some combination of software and one or more devices, and the like.

A sensor may read data from one or more other security components and create a summary (e.g., aggregated data) based thereon. For example, a sensor may analyze the log of a firewall and produce a summary of what ports were scanned on the firewall, when they were scanned, and the frequency of such scanning. As another example, a sensor may read data regarding the number of connections attempted by a client and how many connection attempts failed and may output a summary on this data. As yet another example, a sensor may read data about malware that an anti-malware engine has detected and may output a summary of the malware detected.

A sensor (e.g., a security context sensor 217) may obtain data from the assessment store 210 and may provide output data to other sensors and/or the rule(s) 220. This is one way in which assessments of security may be used as input without having the sensors, rules, or consolidators maintain state.

The above examples of data are intended to be exemplary only and are not intended to be exhaustive or all-inclusive of the types of data a sensor may read. Indeed, based on the teachings herein, those skilled in the art will recognize many types of data that may be read and analyzed by a sensor to create aggregated data that may be useful in determining the security of assets.

In one embodiment, a sensor may have components that are distributed across more than one device. For example, a sensor may have a component that reads a firewall log from a firewall and that transmits this to another component that analyzes the firewall log and creates a summary based thereon.

A sensor may sift through vast quantities of data and may extract portions of the data that are relevant to security when creating the sensor's output.

In another embodiment, a sensor may comprise a component that reads data from a first data store and writes summary data to a second data store. The first data store and the second data store may reside on a single or multiple storage devices. What places the data on the first data store is not a concern to the sensor. Furthermore, how the summary data is used after being written to the second data store is also not of concern to the sensor. Rather, the sensor's sole job may be to read the first data and create the summary data therefrom. Based on the teachings herein, it will be recognized that this simplifies the process of creating sensors.

As mentioned previously, a sensor may obtain data that was generated by one or more other sensors. For example, referring to FIG. 2, one or more of the sensors 216 may read data generated by one or more of the sensors 215. As another example, a sensor that reads a firewall log may output summary data that may be read by one or more other sensors. One of these other sensors may read this output summary and determine the number of "dangerous" network destination to which a client sent packets and may output a value corresponding to the number. Another of these sensors may read this output summary data and determine how many ports a client accessed and generate output corresponding thereto. Yet another of these sensors may read this output summary, determine the number of failed connection, and generate output corresponding thereto.

A rule may use data output from one or more sensors. For example, a rule may use summary data that indicates how many ports a client has scanned on a firewall together with data from a security context sensor that indicates that the client is vulnerable to determine whether the client has been compromised.

A rule analyzes sensor output and compares it to some conditions. If the conditions are met, the rule may make a candidate assessment. The analytics engine 205 may place the candidate assessment in the candidate assessment store 225. A candidate assessment indicates a possible assessment for an asset and may also indicate a time at which the candidate assessment is to expire. There may be one or more candidate assessments for each asset.

The analytics engine 205 stores the candidate assessments in the candidate assessment store 225 and removes the candidate assessments when they expire. The candidate assessment store 225 preserves candidate assessments proposed by rules for each severity and fidelity. The analytics engine 205 may maintain storage so that for each rule, per asset, there is a place to put assessments of all possible severities and fidelities. When a rule suggests a certain candidate assessment, the analytics engine 205 may perform a resolution between this candidate assessment and a candidate assessment already existing in the store 225 (if any). For example, if the candidate assessment suggested by a rule has greater expiration time than a corresponding candidate assessment in the store 225, the analytics engine 205 may updates the candidate assessment in the store 225.

In one embodiment, the candidate assessment store 225 stores all candidate assessments generated by a rule subject to the expiration date of each candidate assessment. In other embodiments, the analytics engine 205 may filter out some candidate assessments and store only assessments with different fidelities or severities or may even perform some resolution and abandon weaker assessments.

A consolidator (e.g., one of the consolidators 230) takes as input candidate assessments about an asset from the candidate assessment store 225 and determines a consolidated assessment for the asset. A consolidator may combine data from multiple candidate assessments from multiple rules in determining an assessment for an asset. For example, a consolidator may read a candidate assessment that there was port scanning that was indicated as a medium fidelity and may read another candidate assessment that there were many failed connection attempts that have been assessed with a medium fidelity. In response to these two candidate assessments and fidelities, a consolidator may make a consolidated assessment that the asset has been compromised with high fidelity.

A consolidator may be built with a knowledge of the rules that caused the candidate assessments so that the consolidator may make a better consolidated assessment. For example, the consolidator may be built with rules that state that if two or more candidate assessments come from certain two or more rules, that the likelihood that the asset is compromised is increased.

A consolidator may use candidate assessments that have different expirations and that were created at different times. For example, one candidate assessment may have a 30 minute expiration and be created at time X while another candidate assessment may have a 45 minute expiration and be created at time Y.

In one embodiment, each consolidator does not maintain state about previous assessments. Rather, each consolidator just looks at the appropriate candidate assessments and allows the analytics engine 205 to remove the candidate assessments that have expired.

When a candidate assessment changes, the analytics engine 205 may call consolidator(s) 230 for each asset for which the candidate assessment has changed. In one embodiment, in calling a consolidator, the analytics engine 205 may present the candidate assessment with the maximum fidelity among all candidate assessments that have the same severity. The consolidator(s) 230 may also merge other attributes from joined assessments such as time to expire, start time, information associated with an assessment, and the like.

The realizer 235 publishes assessments from the consolidator(s) 230 to the assessment store 210. The realizer 235 may forego publishing an assessment that is already available in the assessments store 210. If the state of an assessment has changed, the realizer 235 may update the old assessment to make it consistent with the new assessment or may delete the old assessment and create a new assessment. The realizer 235 may perform updates to the assessments store 210 as they become available or may update the assessments store 210 in a "lazy" manner.

The assessment store 210 is any one or more devices, mechanisms, software, combination of the above, and the like to which public assessments may be sent and from which assessments may be received, and the like. In one embodiment, the assessment store 210 comprises a storage medium as that term is described in conjunction with FIG. 1.

In operation, a sensor may notify the analytics engine 205 when the sensor has received additional input. For example, a sensor that receives data from a timer may notify the analytics engine 205 when the timer fires. As another example, a sensor that reads a firewall log may notify the analytics engine 205 when additional data is available in the firewall log. When the analytics engine 205 is notified by a sensor, the analytics engine 205 may begin executing various components as will be described in greater detail below.

When the analytics engine 205 receives a notification that it is to execute components, the analytics engine begins doing so using the following principles:

1. If one component is dependent on another component, the components are invoked (e.g., executed) in the order of dependency.

2. In one embodiment a component may not be invoked in parallel to itself. For example, if a sensor reads data from a firewall log, the analytics engine 205 will not create two instances of the sensor and have them both read from the firewall log at the same time.

3. A second component is not invoked in parallel to a first component on which the second component depends. Rather, the first component is allowed to complete the generating of its output before the second component provided with that output.

The analytics engine 205 may analyze dependencies between components when the components are installed, on the fly, using some combination of when installed and on the fly, and the like. Installing components and events of security data availability may be independent. Data availability may trigger the analytics engine 205 to perform its activities.

Figure 3:
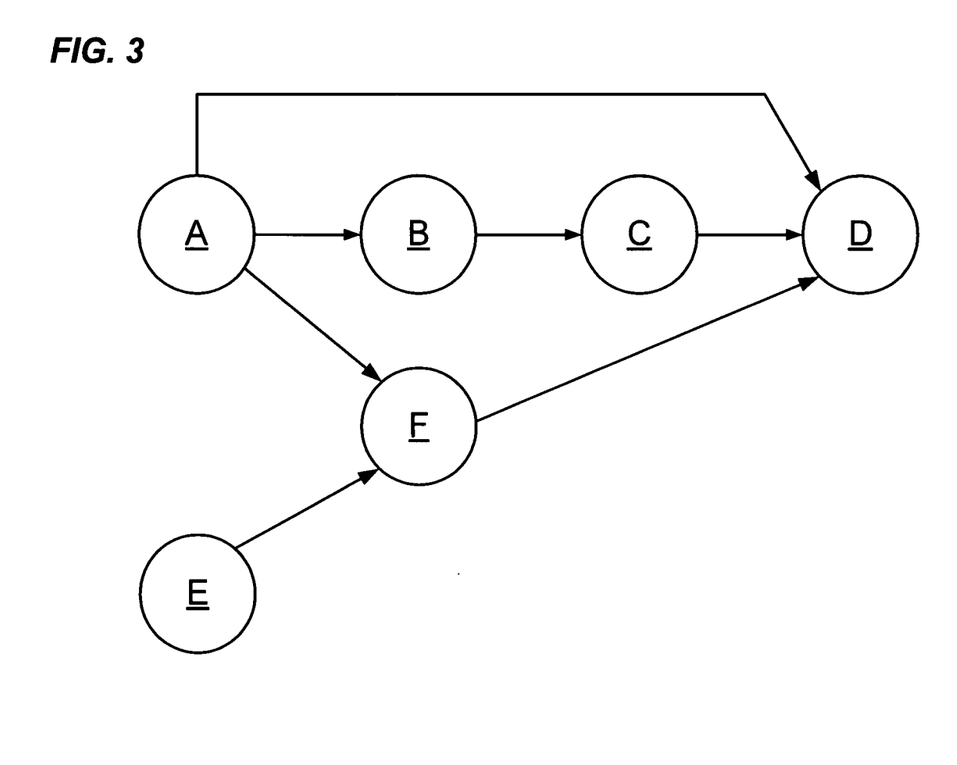
FIG. 3 is a block diagram that generally represents an exemplary topology of components associated with an analytics engine in accordance with aspects of the subject matter described herein.

FIG. 3 is a block diagram that generally represents an exemplary topology of components associated with an analytics engine in accordance with aspects of the subject matter described herein. A first component is said to be dependent on a second component if the first component uses output from the second component to perform calculations. For example, referring to FIG. 2, sensor(s) 216 are dependent on sensor(s) 215. Rule(s) 220 are dependent on sensor(s) 216 and security context sensor(s) 217. The consolidator(s) 230 are dependent on rule(s) 220.

Turning back to FIG. 3, if component A is triggered, an analytics engine may invoke A, B, C, F and D. The analytics engine will take care to execute A before B, D, and F, B before C, and D only after A, C, and F. However, the analytics engine may execute B and F in parallel and/or C and F in parallel. In this example, although the component A is triggered, the analytics engine will not invoke the analytics component E.

The components A-F may correspond to the sensor(s) 215-217, rules 220, and consolidator(s) 230 of FIG. 2. The topology and dependencies of the components may be configured via a user interface, statically, programmatically, or otherwise. Components may be reused in various configurations, thus speeding the development of new security components.

Returning to FIG. 2, the analytics engine 205 may accumulate output generated be each component and may forward this output to one or more components that depend on this output. Furthermore, the analytics engine 205 may forward just the output (e.g., the difference) that has been generated since the last time output was provided to the one or more components that depend on this output. The analytics engine 205 stores and maintains state as needed and allows the components to be focused solely on their direct domain of analysis. The analytics engine 205 may also cause a component to execute when it is that component's turn to execute and thus orchestrate the analysis performed by the components.

In one embodiment, the sensors 215-217, rule(s) 220, and consolidator(s) 230 may be stateless. That is, these components may be able to do their work using solely the input data that they receive together with the logic contained in them. As will be recognized based on the teachings herein, this simplifies the process of creating these components. Aspects of the subject matter described herein, however, will also work with security components that maintain state.

The analytics engine 205 may come with a packaged set of components such as a timer sensor, a security context sensor, a stored query language (SQL) stored procedure execution sensor, a rule for analyzing data tables, and a consolidator that creates assessment(s) out of candidate assessment(s) with highest severity and fidelity. These components may be used as prototypes for more specific analytics components, may be used in production, and may be used in other ways without departing from the spirit or scope of aspects of the subject matter described herein.

Figure 4:
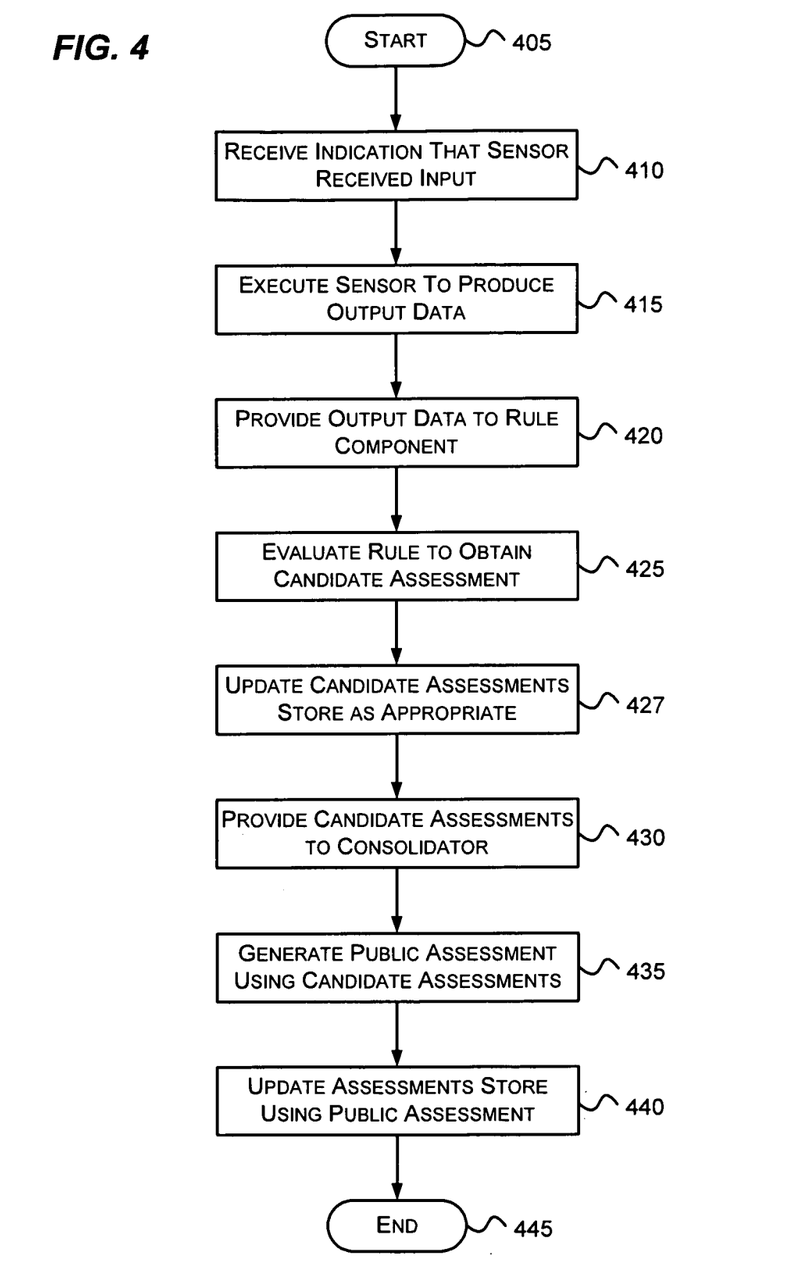
FIG. 4 is a flow diagram that generally represents some exemplary actions that may occur from when a sensor receives input to when an assessment store is updated in accordance with aspects of the subject matter described herein.
Figure 5:
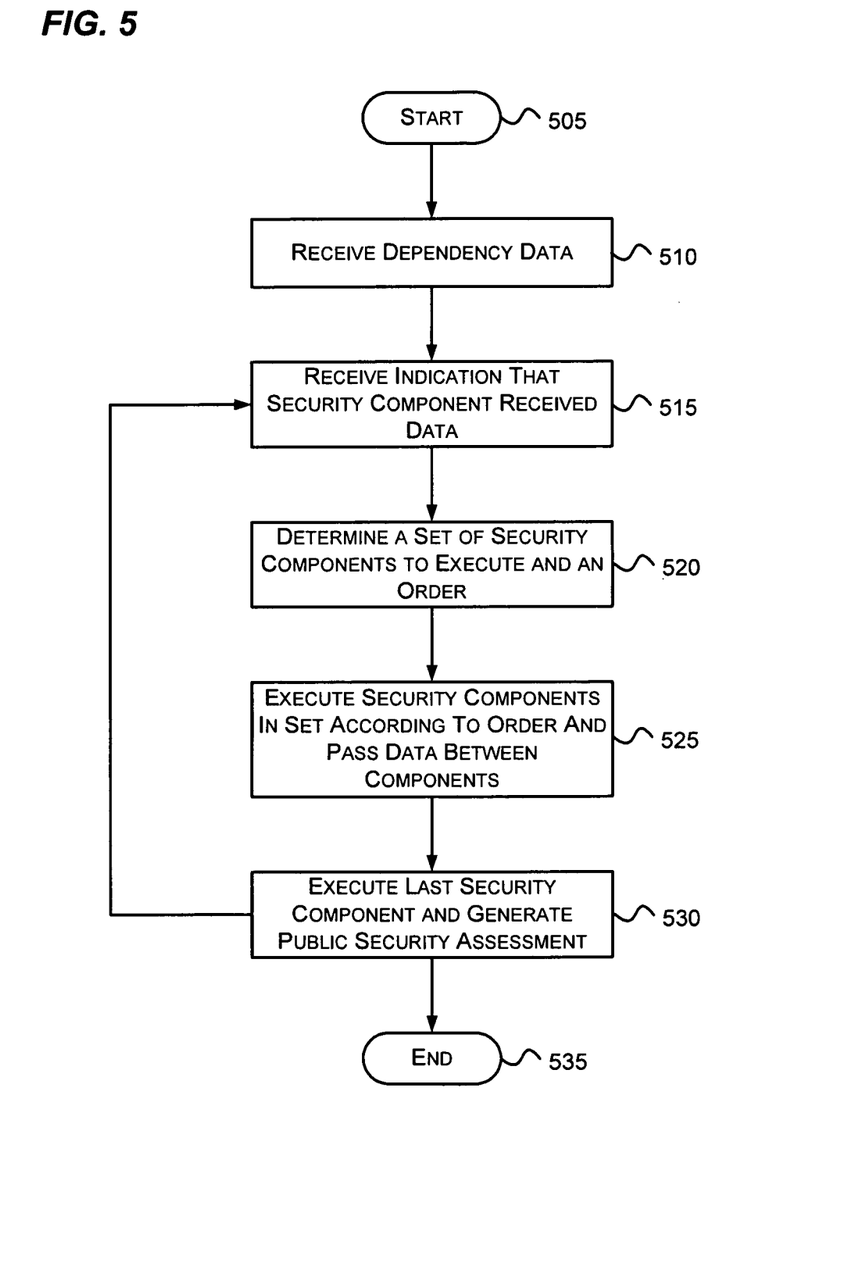
FIG. 5 is a flow diagram that generally represents actions that may occur in determining a set of security components to execute and an order in which to execute the security components in accordance with aspects of the subject matter described herein.

FIGS. 4-5 are flow diagrams that general represent actions that may occur in making security assessments in accordance with aspects of the subject matter described herein. For simplicity of explanation, the methodology described in conjunction with FIGS. 4-5 are depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 4 is a flow diagram that generally represents some exemplary actions that may occur from when a sensor receives input to when an assessment store is updated in accordance with aspects of the subject matter described herein.

Turning to FIG. 4, at block 405, the actions begin. At block 410, an indication that a sensor has received input is received. For example, referring to FIG. 2, a sensor (e.g., one of the sensors 215) may indicate that there is data available for it to process. An indication that a sensor has received input may comprise an indication that data is available for the sensor to process. This might come from a corresponding component of a sensor. For example, this indication may come from a component that resides on a firewall and that monitors a firewall log for additional logging activity.

At block 415, the sensor is executed to produce output data. For example, referring to FIG. 2, the sensor (e.g., the one of the sensor(s) 215 that provided the indication) is executed. In executing, the sensor generates output data from the input data it received.

At block 420, the output data is provided to a rule component. For example, referring to FIG. 2, a sensor (e.g., one of the sensors 216) provides output data. The analytics engine 205 provides this output data to one or more of the rule(s) 220.

At block 425, the rule is evaluated to obtain a candidate assessment. For example, referring to FIG. 2, the analytics engine 205 evaluates the selected rule which produces a candidate assessment.

At block 427, a candidate assessments store is updated as appropriate. For example, referring to FIG. 2, the analytics engine 205 may store the candidate assessment obtained at block 425 in the candidate assessment store 225. Note that a candidate assessment may indicate that there is not a detected security threat associated with an asset.

At block 430, the candidate assessment is provided to a consolidator. For example, referring to FIG. 2, the candidate assessment stored in the candidate assessment store 225 and any other candidate assessments related to an asset are provided to one of the consolidators 230.

At block 435, a consolidator generates a public assessment using the candidate assessment and any other candidate assessments related to an asset. For example, referring to FIG. 2, one of the consolidators 230 generates a public assessment using the candidate assessments related to an asset. The term "public assessment" is an assessment that is provided to components outside of the analytics engine 205 whereas a "candidate assessment" is an assessment that remains private to the analytics engine 205.

At block 440, the assessments store is updated using the public assessment. For example, referring to FIG. 235, the realizer 235 publishes the public assessment to the assessments store 210.

At block 445, the actions end.

FIG. 5 is a flow diagram that generally represents actions that may occur in determining a set of security components to execute and an order in which to execute the security components in accordance with aspects of the subject matter described herein. At block 505, the actions begin.

At block 510, dependency data is received. For example, referring to FIGS. 2 and 3, the topology represented in FIG. 3 is presented to the analytics engine 205.

At block 515, an indication is received that a security component has received data. For example, referring to FIG. 3, the component A, a sensor, receives data.

At block 520, a determination is made as to a set of security components to execute and an order in which to execute the security components of the set. For example, referring to FIGS. 2 and 3, the analytics engine 205 determines that A, B, C, D and F are to be executed that A is to be executed before B, D, and F, B before C, and D only after A, C, and F. However, the analytics engine may execute B and F in parallel and/or C and F in parallel.

At block 525, the determined security components are executed in the order determined. Data is passed from component to component as needed. For example, referring to FIG. 3, data outputted by A is passed to B, D, and F. Data outputted by B is passed to C. And data outputted by C and F is passed to D.

At block 530, the last security component of the determined set is executed. This security component generates and/or publishes the public security assessment. For example, referring to FIG. 2, one of the consolidator(s) 230 executes and generates a public security assessment. This security assessment may be published by the realizer 235.

After block 530, if additional data becomes available, the actions proceed to block 515. If the analytics engine 205 is shut down, the actions proceed to block 535.

At block 535, the actions end.

As can be seen from the foregoing detailed description, aspects have been described related to assessing security. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:

receiving dependency data that indicates dependencies among security components, a security component having a dependency on another security component if the security component uses output data generated by the other security component, the security components including a sensor;

receiving an indication that input data related to security has been received at the sensor;

executing the sensor to produce output data based on the input data, the executing of the sensor including, based at least in part on the dependency data, determining a set of the security components to execute and an order in which to execute the security components of the set, the set including the sensor;

providing the output data produced by the sensor to a rule, the rule being separate from the sensor;

evaluating the rule to produce a first candidate assessment comprising a proposed assessment regarding security of a computer-related asset, the first candidate assessment including a first fidelity;

generating by a consolidator a consolidated assessment regarding security of the computer-related asset by evaluating a plurality of proposed assessments comprising the first candidate assessment and a second candidate assessment regarding security of the computer-related asset, the second candidate assessment including a second fidelity and the first candidate assessment, second candidate assessment and consolidated assessment representing three security assessments of the same computer-related asset; and providing output data from a first security component of the set of the security components to one or more other security components of the set that depend from the first security component.

2. The method of claim 1, further comprising storing the first candidate assessment in a candidate assessment store, the first candidate assessment including an expiration time and a severity, the first fidelity being one of at least three different possible fidelity values.

3. The method of claim 1, further comprising producing a public assessment by publishing the consolidated assessment to an assessment store.

4. The method of claim 1, wherein the sensor, the rule, and the consolidator maintain no state with respect to previous security assessments.

5. The method of claim 3, wherein the public assessment including an expiration time, a severity, and a fidelity.

6. In a computing environment, an apparatus, comprising:
a sensor operable to receive input data related to computer security and to provide output data in response thereto;
a rule component operable to receive the output data and to generate a first candidate assessment comprising a proposed assessment based at least in part on the output data, the first candidate assessment including a first fidelity;
a consolidator operable to determine a consolidated assessment by evaluating a plurality of proposed assessments comprising the first candidate assessment and a second candidate assessment including a second fidelity, the first candidate assessment, second candidate assessment and consolidated assessment representing three security assessments of the same computer-related asset; and a realizer operable to publish the consolidated assessment to an assessments store, making the consolidated assessment a public assessment; and a dependency unit configured to receive dependency data that indicates dependencies among security components, a security component having a dependency on another security component if the security component uses output data generated by the other security component, the sensor being one of the security components, the dependency unit being further configured to, based at least in part on the dependency data, determine a set of the security components to execute and an order in which to execute the security components of the set and to provide output data from a first security component of the set to one or more other security components of the set that depend on the first security component, the order including having two of the security components execute in parallel, the two security components not depending on each other directly or indirectly, the order further including having a first one or more other security components of the set that depend on the first security component execute after the first security component executes, each security component generating output data based solely on input data and logic included in the security component, the dependency unit being further configured to wait to execute a second security component until all security components upon which the second security component depends have completed execution.

7. The apparatus of claim 6, wherein the sensor receives the input data from a device remote from the apparatus.

8. the apparatus of claim 6, wherein the sensor receives the input data from the assessments store.

9. The apparatus of claim 6, wherein the sensor generates the output data using solely the input data and logic included in or associated with the sensor.

10. The apparatus of claim 6, wherein the apparatus further comprises an engine that is operable to perform actions, comprising:
receiving the output data from the sensor;
providing the output data from the sensor to the rule component;
storing the first candidate assessment in a candidate assessment store;
providing the first candidate assessment to the consolidator;
providing the consolidated assessment to the realizer; and
storing the consolidated assessment in the assessments store.

11. The method of claim 1, wherein the input data is provided by another sensor that creates the input data by actions comprising examining other input data.

12. The method of claim 11, wherein the other input data comprises as assessment.

13. The method of claim 12, wherein the other input data comprises a log of a security component.

14. The apparatus of claim 6, wherein the sensor receives the input data from another sensor.

15. A computer-readable storage device having computer-executable instructions recorded thereon, which when executed by at least one processor perform actions, the actions comprising:
receiving dependency data that indicates dependencies among security components, a security component having a dependency on another security component if the security component uses output data generated by the other security component, the security components including a sensor;

receiving an indication that input data related to security has been received at the sensor;

executing the sensor to produce output data based on the input data, the executing of the sensor including, based at least in part on the dependency data, determining a set of the security components to execute and an order in which to execute the security components of the set, the set including the sensor;

providing the output data produced by the sensor to a rule, the rule being separate from the sensor;

evaluating the rule to produce a first candidate assessment comprising a proposed assessment regarding security of a computer-related asset, the first candidate assessment including a first fidelity;

generating by a consolidator a consolidated assessment regarding security of the computer-related asset by evaluating a plurality of proposed assessments comprising the first candidate assessment and a second candidate assessment regarding security of the computer-related asset, the second candidate assessment including a second fidelity, the consolidated assessment including a third fidelity that is different from at least one of the first fidelity and the second fidelity and the first candidate assessment, second candidate assessment and consolidated assessment representing three security assessments of the same computer-related asset; and providing output data from a first security component of the set of security components to one or more other security components of the set that depends from the first security component.

16. The computer storage medium of claim 15, wherein the generating the consolidated assessment comprises merging a first time to expire included in the first candidate assessment with a second time to expire included in the second candidate assessment.

17. The computer storage medium of claim 15, wherein the generating the consolidated assessment comprises merging a first start time included in the first candidate assessment with a second start time included in the second candidate assessment.

18. The computer storage medium of claim 15, wherein the actions further comprise:

publishing the consolidated assessment to an assessments store.

\* \* \* \* \*